Sept. 17, 1946.  E. W. GROVE, 3D  2,407,779
PERAMBULATOR
Filed July 28, 1945
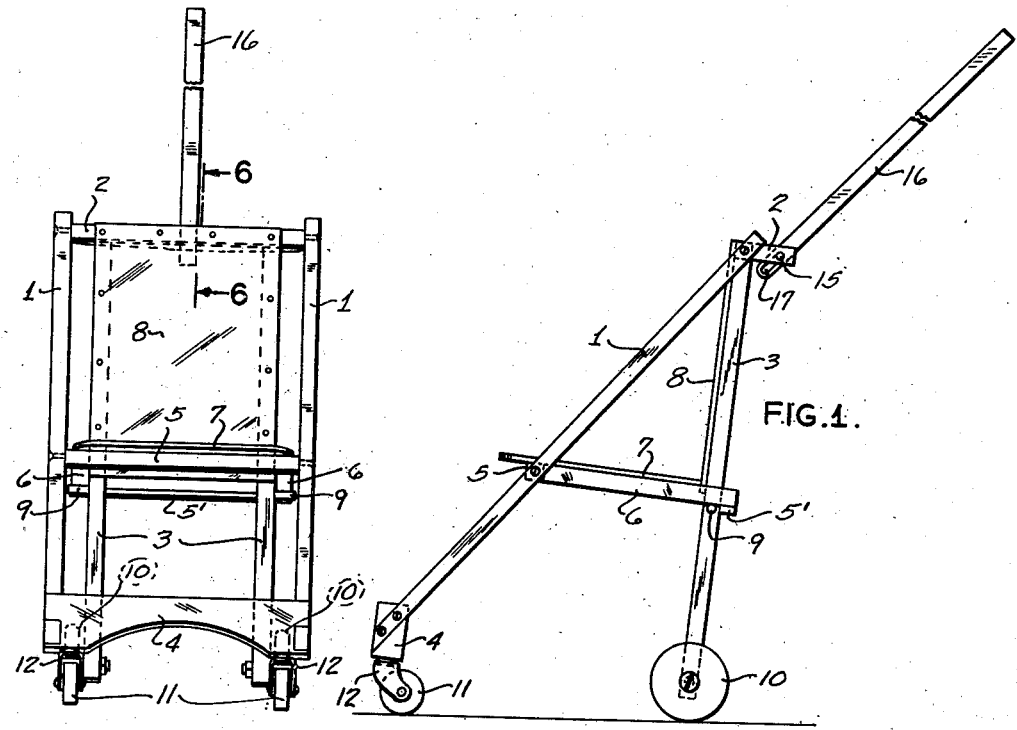
FIG.1.
FIG.2.
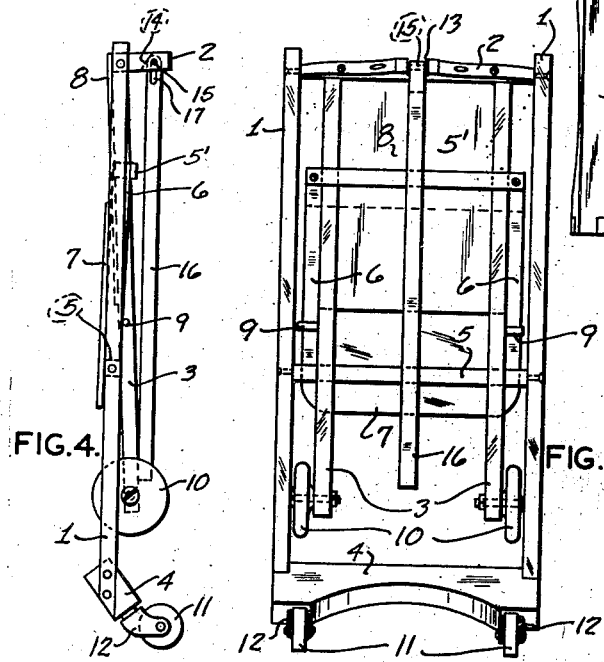
FIG.4.  FIG.5.
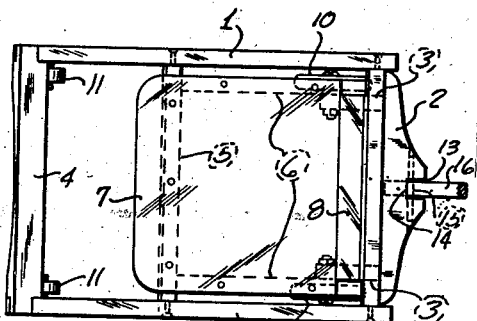
FIG.3.
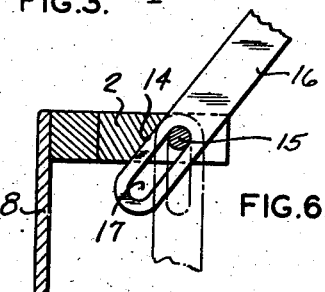
FIG.6.
INVENTOR
EDWIN W. GROVE III
By J. E. Cook
ATTORNEY Patented Sept. 17, 1946

2,407,779

UNITED STATES PATENT OFFICE 2,407,779

PERAMBULATOR

Edwin W. Grove, III, Ladue, Mo.

Application July 28, 1945, Serial No. 607,577

1 Claim. (Cl. 280—41)

This invention relates to perambulators, particularly to the foldable type, the principal object of the invention being to produce such a vehicle which can be folded or opened up for use by a single operation, that is, by raising or lowering the seat, respectively.

Other advantages of the invention are its light weight, so that it can be transported by hand when not in use, and its simplicity of construction, so that it can be cheaply produced and has no parts that will easily get out of order. Another feature is that it can be folded practically flat for convenient storage when not in use.

In the drawing:

Fig. 1 is a side elevation of the perambulator in operative position.

Fig. 2 is a front elevation thereof in operative position.

Fig. 3 is a top plan view of the perambulator in operative position.

Fig. 4 is a side elevation illustrating the perambulator in folded position.

Fig. 5 is a rear elevation of the vehicle in closed position.

Fig. 6 is an enlarged detailed section taken on line 6—6, Fig. 1.

The invention comprises a pair of parallel, diagonal members 1 (describing it now in its unfolded position) connected near their upper extremities by an irregularly shaped member 2 which is pivotally engaged at each of its ends with one of the diagonal members 1. Near the ends of the member 2 but spaced a slight distance away from the diagonal members 1 a pair of legs 3 is rigidly secured to the member 2, said legs diverging slightly from the perpendicular when the perambulator is in its unfolded position.

A footrest 4 extends between the diagonal members 1 at their lower extremities, and at a suitable height to seat a child comfortably. A supporting cross-bar 5 is pivotally attached to the diagonal members 1. A pair of supporting bars 6 extend backwardly from the bar 5 to the legs 3, with which the bars 6 are in slidable engagement, and a cross-bar 5' connects the supporting bars 6 at their rearward ends. A seat 7 is secured to the bars 5, 5', and 6, and a brackrest 8 is secured to the legs 3, and pins 9 on the legs 3 serve to stop the bars 6 from sliding downwardly on said legs beyond a predetermined point. At its lower end each leg 3 is provided with a wheel 10, and near each end of the footrest a smaller wheel 11 is attached for swiveling action through a caster 12.

As previously mentioned, the member 2 is irregularly shaped, as most clearly illustrated in Fig. 3, and at the center of its rear edge it is provided with a cut-out section 13, the front wall 14 of which slants forwardly from top to bottom, as shown most clearly in Figs. 4 and 6. A retaining pin 15 is positioned in the member 2 so that it passes through the cut-out section 13 from side to side of said cut-out section. A handle rod 16 has at one of its ends an elongated slot 17 and is so positioned on the vehicle that the retaining pin 15 passes through the slot 17, which is of such diameter as to permit the handle to swing easily about said retaining pin.

In operation the procedure is as follows:

Suppose the perambulator is in its open, operative position, as illustrated in Figs. 1, 2, and 3, and the intention is to fold it. The handle 16 is dropped so that it will swing on the retaining pin 15 to a perpendicular position. The rear edge of the seat 7 and its supporting cross-bar 5' are drawn upwardly on the legs 3, which draws the forward edge of the seat and the cross-bar 5 backwardly toward the legs 3, and also has the effect of drawing the diagonal members 1 toward the legs 3 by virtue of the pivotal connection between the bar 5 and the diagonal members 1. As this movement continues it will be seen that the seat 7 moves to a vertical position and comes to rest against the back 8, at which time the diagonal members 1 will have assumed a position parallel with and adjacent to the legs 3. It will now be found that the diagonal members 1, the legs 3, the seat 7, the backrest 8, and the handle 16 are all in substantially vertical position, as shown in Figs. 3 and 5, with the wheels 10 spaced at some distance above the wheels 11, and the perambulator can either be easily lifted and carried by hand, or it can be propelled in its folded position on the wheels 11.

To open the perambulator to its unfolded, operable position, the above operation is simply reversed by pushing down the rear edge of the seat 7 and the supporting cross-bar 5', which has the effect of pushing forward the front edge of the seat and the supporting cross-bar 5, and by virtue of their pivotal attachment to said crossbar 5 the diagonal members 1 are also pushed forwardly. When the bars 6 come to rest on the stop pins 9, the seat will be in its horizontal position and the diagonal members 1 will have been pushed forwardly until they have again assumed the position shown in Fig. 1.

The handle 16 is then swung upwardly on the retaining pin 15 and allowed to slip down so that said pin is positioned in the upper end of the slot 17 and the upper surface of the handle 16 lies against the slanting wall 14 of the cut-out portion 13 of the member 2, as shown in Figs. 1 and 6. It is obvious that with the parts mentioned in this position, a forward push on the handle 16 to propel the vehicle has the effect of forcing the end of the handle tightly against the slanting wall 14, where it is held in frictional engagement, and the harder they push, the tighter the engagement. The perambulator is now once more in its operable position.

I claim:

A foldable perambulator comprising in its unfolded position a pair of parallel, diagonal side members and a pair of vertical supporting legs, a plurality of horizontal elements connecting said diagonal members and said supporting legs and a seat attached to said horizontal elements, certain of said connecting elements being in pivotal engagement with said side members and in sliding engagement with said legs, stop means for limiting the movement of said sliding elements, a backrest, a handle provided with a slot, and a rigid connecting element between said legs upon which said handle is swingably mounted, said rigid connecting element having a cut-out portion with an inclined wall, retaining means passing through said cut-out portion and through the slot of the handle whereby said handle is held in frictional engagement with said inclined wall, and rotatable propelling means, said side members, vertical legs, seat, backrest, and handle being adapted to be brought into substantially parallel positions with relation to each other through a single operation.

EDWIN W. GROVE, III.